United States Patent
Sundaram et al.

(10) Patent No.: US 7,568,026 B2
(45) Date of Patent: *Jul. 28, 2009

(54) METHOD AND SYSTEM FOR EFFICIENT LINK RECOVERY FOR FIBRE CHANNEL OVER SONET/SDH TRANSPORT PATH

(75) Inventors: Ganesh Sundaram, Rohnert Park, CA (US); Thomas Eric Ryle, Raleigh, NC (US); Hitesh Amin, Petaluma, CA (US); John Diab, Santa Rosa, CA (US); Yves Charles Vidal, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

This patent is subject to a terminal disclaimer.

(21) Appl. No.: 10/779,411

(22) Filed: Feb. 13, 2004

(65) Prior Publication Data

US 2005/0216783 A1 Sep. 29, 2005

(51) Int. Cl.
*G06F 15/173* (2006.01)
(52) U.S. Cl. .................................. 709/224; 709/248
(58) Field of Classification Search ................. 709/224, 709/248
See application file for complete search history.

(56) References Cited

U.S. PATENT DOCUMENTS

| | | | |
|---|---|---|---|
| 5,999,528 A | 12/1999 | Chow et al. | 370/365 |
| 6,014,370 A | 1/2000 | Komatsu et al. | 370/248 |
| 6,229,822 B1 | 5/2001 | Chow et al. | 370/474 |
| 6,269,081 B1 | 7/2001 | Chow et al. | 370/241 |
| 6,624,770 B1 | 9/2003 | Tsai et al. | 341/102 |
| 6,636,529 B1 | 10/2003 | Goodman et al. | 370/469 |
| 6,647,528 B1 | 11/2003 | Collette et al. | 714/758 |
| 6,654,383 B2 | 11/2003 | Haymes et al. | 370/466 |
| 7,298,694 B2* | 11/2007 | Kamiya et al. | 370/218 |
| 2003/0074449 A1* | 4/2003 | Smith et al. | 709/226 |
| 2004/0114924 A1* | 6/2004 | Holness et al. | 398/33 |
| 2005/0058064 A1* | 3/2005 | Phelps et al. | 370/225 |

* cited by examiner

*Primary Examiner*—Patrice Winder
*Assistant Examiner*—Thomas Duong
(74) *Attorney, Agent, or Firm*—Edell, Shapiro & Finnan, LLC

(57) ABSTRACT

A method and system for flow control of GFP-encapsulated Fiber Channel frames over SONET/SDH transport networks is described. Transport interfaces, in the form of port cards, monitor any switch-over or error in the SONET/SDH transport network responsive to GFP out of synchronization signals; and transmit Fiber Channel Ordered Sets indicative of non-operation to it associated Fiber Channel port so that the Fiber Channel port performs link initialization and buffer credit recovery procedures with its counterpart Fiber Channel port across the SONET/SDH transport network. This speeds the recovery of the link between the two Fiber Channel ports.

21 Claims, 4 Drawing Sheets

METHOD AND SYSTEM FOR EFFICIENT LINK RECOVERY FOR FIBRE CHANNEL OVER SONET/SDH TRANSPORT PATH

BACKGROUND OF THE INVENTION

The present invention relates generally to digital communication networks, and more specifically, to methods and systems for efficiently transporting Fibre Channel client data over a SONET/SDH network path.

SONET/SDH and optical fiber have emerged as significant technologies for building large scale, high speed, Internet Protocol (IP) based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the network interconnection of computer devices is Fibre Channel, the core standard of which is described in ANSI (American National Standards Institute) X3.230-1994. Arising out of data storage requirements, Fibre Channel currently provides for bi-directional gigabit-per-second transport over communication networks in Fibre Channel frames that consist of standardized sets of bits used to carry data over the network system. Fibre Channel links are limited to no more than 10 kilometers.

New standards and protocols have emerged to combine the advantages of the SONET/SDH and Fibre Channel technologies. For example, it is sometimes desirable to link two SANs (Storage Area Networks), which operate with Fibre Channel protocol, over a MAN (Metropolitan Area Network), or even a WAN (Wide Area Network), which typically operates under SONET or SDH standards. This extension of Fibre Channel from 100 kilometers to over several hundred, or even thousand, kilometers, is made by mapping Fibre Channel ports to a SONET/SDH path for transport across a SONET/SDH network. One way to perform this function is to encapsulate Fibre Channel client data frames into transparent Generic Framing Protocol (GFP-T) frames and then map the GFP-T frames into SONET/SDH frames for transport across the SONET/SDH network. In this manner two Fibre Channel ports can communicate with each other over a SONET/SDH network as though the intervening network links are part of a Fibre Channel network. The Fibre Channel ports remain "unaware" of the SONET/SDH transport path.

Fibre Channel protocol handles the flow of Fibre Channel data frames with buffer credit management. Two communicating Fibre Channel nodes initially report to each other on the amount of space (credits) in each port's buffer available to receive Fibre Channel frames from the other port. Once the credits are established, a transmitting node sends its frames and uses its credits. Upon receiving the frames, the receiving node sends back some acknowledgment signal so that the credits of the transmitting node are replenished for more transmission. In end-to-end flow control, the frame source and frame destination nodes are the two nodes; in buffer-to-buffer credit flow control, the two nodes on opposite sides of a link are the two nodes.

Fibre Channel systems are sensitive to frame loss and, despite the transparency with encapsulating Fibre Channel frames in GFP-T envelopes for transport over a SONET/SDH network, there is the possibility of glitches or errors in the a SONET/SDH network. The result is reduced throughput and/or extended failure times, which is contrary to the high-speed nature of Fibre Channel.

The present invention permits Fibre Channel ports to restore the apparent link between the ports quickly from failures in the SONET/SDH transport path without undue complexity.

SUMMARY OF THE INVENTION

The present invention provides for a method for the efficient link recovery between first and second Fibre Channel ports communicating by the transport of GFP-encapsulated Fibre Channel client data frames across a SONET/SDH transport network. The first Fibre Channel port is connected to the SONET/SDH transport network through a first transport interface and the second Fibre Channel port is connected to the SONET/SDH transport network through a second transport. The method includes the steps of detecting an interruption in the SONET/SDH transport network responsive to a GFP loss of synchronization; and of transmitting Ordered Sets indicative of non-operation from the first transport interface to the first Fibre Channel port so that the first Fibre Channel port performs link initialization and buffer credit recovery procedures with the second Fibre Channel port.

The present invention also provides for a first transport interface in a network system for transporting GFP-encapsulated Fibre Channel frames across a SONET/SDH transport network between first and second Fibre Channel ports with the first Fibre Channel port connected to the SONET/SDH transport network through the first transport interface and the second Fibre Channel port connected to the SONET/SDH transport network through a second transport interface. The first transport interface comprises at least one integrated circuit adapted to detect an interruption in the SONET/SDH transport network responsive to GFP out of synchronization signals; and to transmit Ordered Sets indicative of non-operation to the first Fibre Channel port so that the first Fibre Channel port performs link initialization and buffer credit recovery procedures with the second Fibre Channel port.

The above is a brief description of some deficiencies in the prior art and features of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications should be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1A:
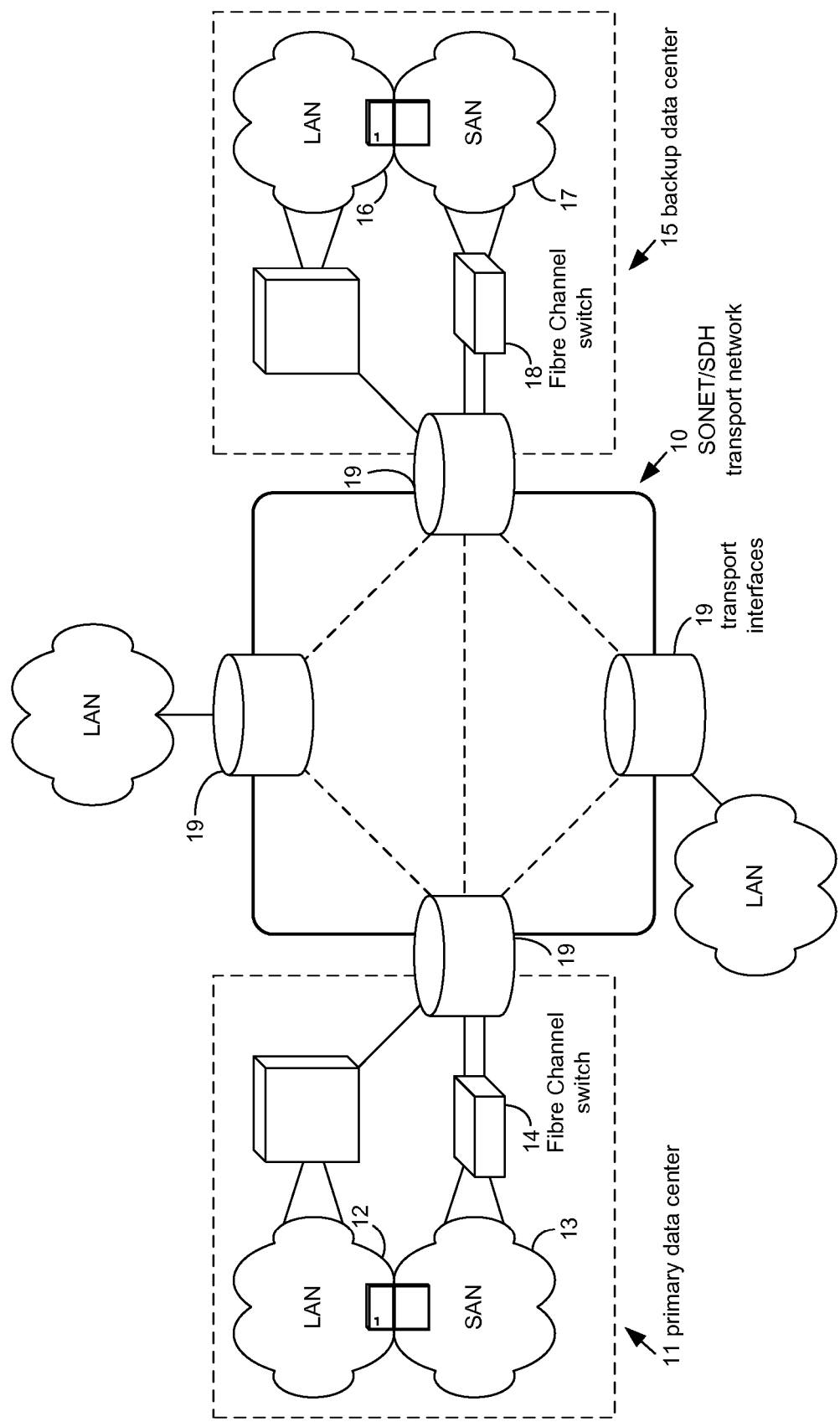
FIG. 1A is a representational diagram showing how an SONET/SDH network might be used to connect different network systems, including Fibre Channel.

FIG. 1A shows an exemplary network with a primary data center 11 with a local area network (LAN) 12 and interconnected Storage Area Network (SAN) 13 might be connected to a backup data center 15 with its local area network (LAN) 16 and interconnected Storage Area Network (SAN) 17 over a SONET/SDH transport network 10, in this case, an OC-48 (Optical Carrier-48) ring. Storage Area Networks operate under Fibre Channel protocol and Fibre Channel switches 14 and 18 operate as a Fibre Channel ports and are connected to different transport interfaces 19 respectively for the transport of Fibre Channel data frames over the SONET/SDH transport network 10 between the two data centers 11 and 15. Other transport interfaces 19 for the SONET/SDH transport network 10 might be connected to other local area networks.

Figure 1B:
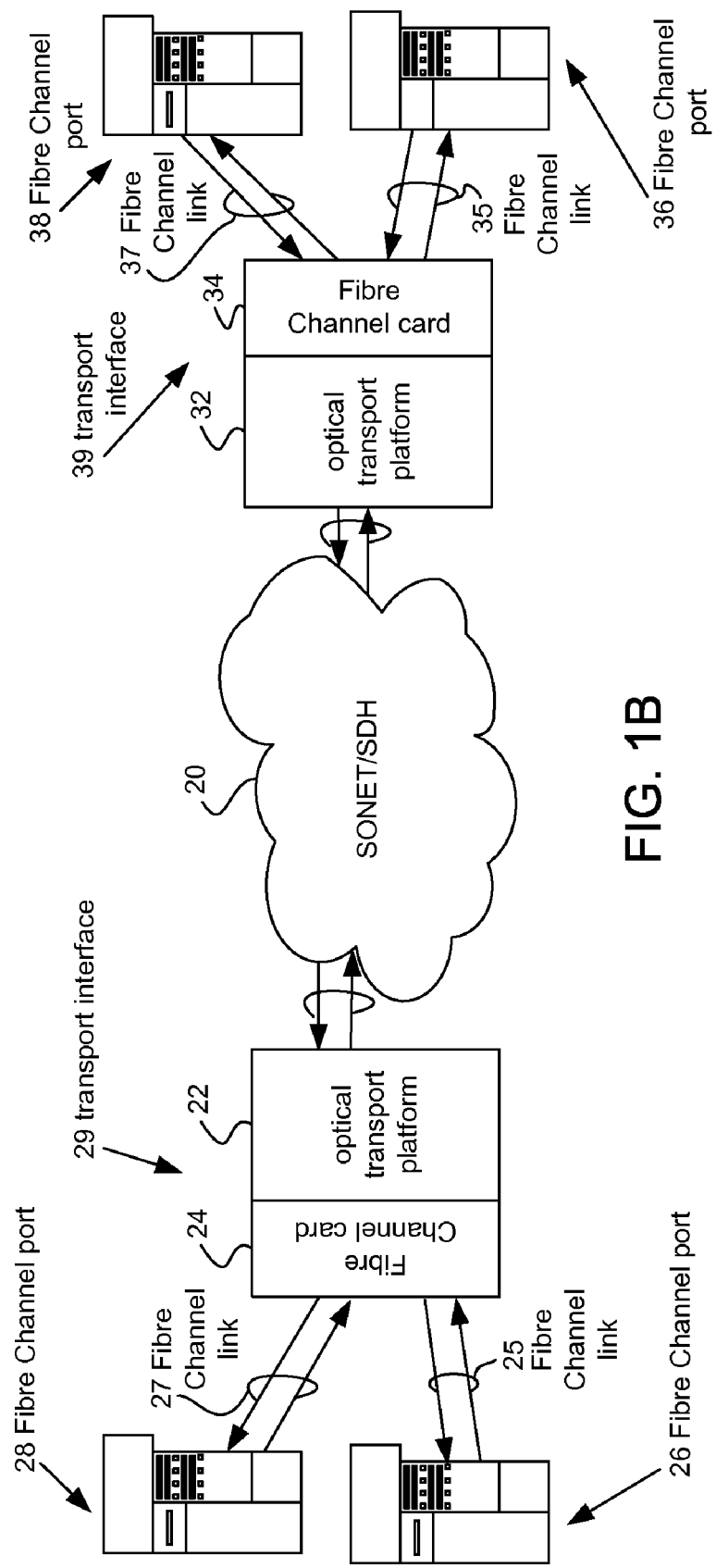
FIG. 1B is a more detailed diagram illustrating the connection of two Fibre Channel systems across an SONET/SDH transport path, according to one embodiment of the present invention.

FIG. 1B illustrates more details of the connection of the Fibre Channel ports (and Fibre Channel networks) over a SONET/SDH network, according to the present invention. In this exemplary and simplified network, a SONET/SDH network 20 has transport interfaces 29 and 39 connected to Fibre Channel ports 26, 28 and 36, 38 respectively. The Fibre Channel ports 26, 28, 36 and 38 are associated with elements which are interconnected by Fibre Channel, such as data storage elements in a Storage Area Network topology, including disk drive arrays, RAIDs, disk farms, or as possibly other Fibre Channel elements, such as routers, switches, or other Fibre Channel network elements.

The Fibre Channel ports 26 and 28 operate under Fibre Channel protocol and are connected by Fibre Channel links 25 and 27 respectively to a multi-port Fibre Channel card 24. Likewise, a second Fibre Channel port card 34 is connected by Fibre Channel links 35 and 37 to Fibre Channel ports 36 and 38 respectively. Each Fibre Channel port card 24 and 34 is connected to a pair of Fibre Channel ports for purposes of illustration, and more ports may be connected to each Fibre Channel port card.

The Fibre Channel port cards 24 and 34, together with optical transport platforms 22 and 32, such as ONS 15454 (available from Cisco Systems, Inc. of San Jose, Calif.), form the transport interfaces 29 and 39 respectively, which provide the interfaces between the Fibre Channel elements/networks and the SONET/SDH network 20. The multi-port Fibre Channel card 24 is adapted to fit into the optical transport platform 22; and the multi-port Fibre Channel card 34 is adapted to fit into the optical transport platform 32. Through the Fibre Channel port cards 24 and 34, and the platforms 22 and 32 respectively, the Fibre Channel ports 26 and 28 are interconnected to the Fibre Channel ports 36 and 38 across the SONET/SDH network transport path. The result is that there are two virtual wires for the connection between a representative Fibre Channel port at one end of the SONET/SDH network 10, say, port 26, and a representative Fibre Channel port at the other end, say, port 36.

As explained above, GFP-T, transparent Generic Framing Procedure, is used as the framing protocol for such a network for encapsulating the Fibre Channel payloads at one end of the SONET/SDH network 10 to be transmitted across the SONET/SDH network and for decapsulating the Fibre Channel data at the other end. The port cards 24 and 34, and their respective optical platforms 22 and 32, provide the transparent transport interfaces between the Fibre Channel ports 28 and 38 over the SONET/SDH network 20 in the exemplary network of FIG. 1B.

There are two ways of encapsulating Fibre Channel frame payloads in the GFP-T envelopes. One is to ensure that each Fibre Channel frame is terminated within a GFP-T payload, i.e., the Fibre Channel frame fits entirely within one GFP-T payload. The second is to remove the restriction that a Fibre Channel frame be terminated within the GFP-T payload so that the Fibre Channel frame can be carried without frame boundaries. In this case, transport latency is desirably reduced and is more suitable for many typical Fibre Channel applications, such as synchronous mirroring. These GFP-T encapsulating ways affect Fibre Channel buffer credit management.

As explained previously, Fibre Channel protocol provides for flow control between two communicating Fibre Channel nodes with either buffer-to-buffer, or end-to-end credit management. With the transparency of the SONET/SDH transport path, the Fibre Channel ports 26, 28 and 36, 38 perform buffer-to-buffer credit management with the simple apparent link being the SONET/SDH network 20. But Fibre Channel is sensitive to frame loss which can occur with glitches, errors and failures, i.e., "traffic hits," on the SONET/SDH network 20. Even with corrective "failovers" by which a failure in the SONET/SDH network causes the network to re-route the transport path by switching over to different links in the SONET/SDH network, Fibre Channel frames will typically be lost.

This Fibre Channel frame loss results in either reduced throughput and/or extended failure times for the Fibre Channel ports communicating over the SONET/SDH transport path. When an interruption, i.e., failover or any traffic hit, in the SONET/SDH network 20 causes some Fibre Channel frames to be lost, the communicating Fibre Channel ports never realize the partial credit loss between the two ports and hence operate with reduced throughput. Extended failure times occur when the Fibre Channel ports must want for 50 ms or more for the SONET/SDH network to recover from a failover or traffic hit. Fibre Channel protocol issues an E_D_TOV, Error Detect Timeout Value, signal indicative that the maximum time of a roundtrip operation, frame transmission and return acknowledgment, has been exceeded. This starts re-logging procedures by the two Fibre Channel ports with each other over the SONET/SDH transport path, which may require several seconds. Hence a 50 ms failure becomes a 10-second link failure between a pair of Fibre Channel ports communicating over the SONET/SDH transport path. Furthermore, even upon re-logging, the Fibre Channel ports may never recover the credits lost so they operate at very low throughput.

One way to avoid this problem is to emulate the Fibre Channel credit management function at the transport interfaces 29 and 39, in particular, the port cards 24 and 34. That is, each port card 24 (34) appears as a Fibre Channel node across a link to its corresponding Fibre Channel port 26 and 28 (36 and 38) to exchange credit management information. Such emulation insulates the Fibre Channel ports 26, 28 and 36, 38 from failovers and traffic hits in the SONET/SDH network 20.

If the first method of encapsulating Fibre Channel frames in GFP-T envelopes is used, the port cards 24 and 34 (the transport interfaces 29 and 39) can easily perform this emulation since each GFP-T envelope contains one (or no) Fibre Channel frame. However, this encapsulating method is limited and proprietary emulation mechanisms are required in both port cards 24 and 34. The second encapsulating method, on the other hand, is complicated to implement since a Fibre Channel frame may extend across more than one GFP-T payload and Fibre Channel credit management counts by Fibre Channel frames. Thus the second method has the desirable property of low-latency, but imposes complexity on credit management emulation.

To avoid or substantially mitigate this problem, the present invention provides for a quick and efficient way of notifying the Fibre Channel ports to reconfigure whenever there is a SONET/SDH failover or traffic hit. Credit management emulation by the transport interfaces 29 and 39 is avoided so that the Fibre Channel buffer-to-buffer credit management is left to the Fibre Channel ports 26, 28, 36 and 38. The sooner a Fibre Channel port is notified of a link failure, the earlier the link can be recovered and traffic resumed once the SONET/SDH failure is removed. The present invention identifies SONET/SDH interruptions and indicates the same to the Fibre Channel ports so that they are able to re-establish the link in a very short time compared to Fibre Channel timeouts. The Fibre Channel ports reduce the link failure times from tens of seconds to a few milliseconds to avoid situations where buffer credits are lost and the SONET/SDH transport path runs at a very low utilization rate with reduced throughput.

In accordance with the present invention, the link recovery mechanism has two parts: 1) detection of the SONET/SDH failovers and bit errors; and 2) signaling to the Fibre Channel client ports that a SONET/SDH failover or bit error has occurred.

SONET/SDH failover and bit errors can occur anywhere in the SONET/SDH transport path between the two communicating Fibre Channel ports. Detections of such errors is not easy for these nodes at the ends of the SONET/SDH transport path from the usual SONET/SDH performance monitoring operations. An alternative is to use GFP extension headers to send incremental sequence numbers to identify if any GFP-T frames are missing due to the SONET/SDH failover/bit errors. However, such an implementation results in incompatibility with other GFP-T equipment since there are no convention-defined extension headers for such use.

Instead, the present invention uses the GFP framing operations to identify SONET/SDH failover/errors. Whenever there is a SONET/SDH failover/error, the GFP engine on the path terminating equipment indicates a multibit error for the CHEC (Core Header Error Check) bits and goes out of synchronization. In the exemplary network of FIG. 1B, GFP engines are found in the transport interfaces 29 and 39, specifically the Fibre Channel port cards 24 and 34. Among other functions, the GFP engines handle the encapsulating and decapsulating operations of Fibre Channel client frames into and out of GFP-T envelopes. The loss of synchronization can be as quick as a multibit error in one GFP-T frame of only 1000 bytes. Hence the detection of the SONET/SDH failover/ error using the GFP engine is much faster than the other alternatives, and the signaling to the Fibre Channel ports of the SONET/SDH failover/error can be performed much faster. The Fibre Channel ports can recover much faster from the link failure and the buffer-to-buffer credit losses.

To signal the SONET/SDH failover/error in the SONET/SDH transport path to the Fibre Channel ports, a stream of Fibre Channel NOS (No Operation) Ordered Sets by the transport interfaces 29 and 39 are sent to their respective Fibre Channel ports. This causes the Fibre Channel ports to perform link initialization operations and to recover all credits lost during the SONET/SDH failover/error.

Figure 2:
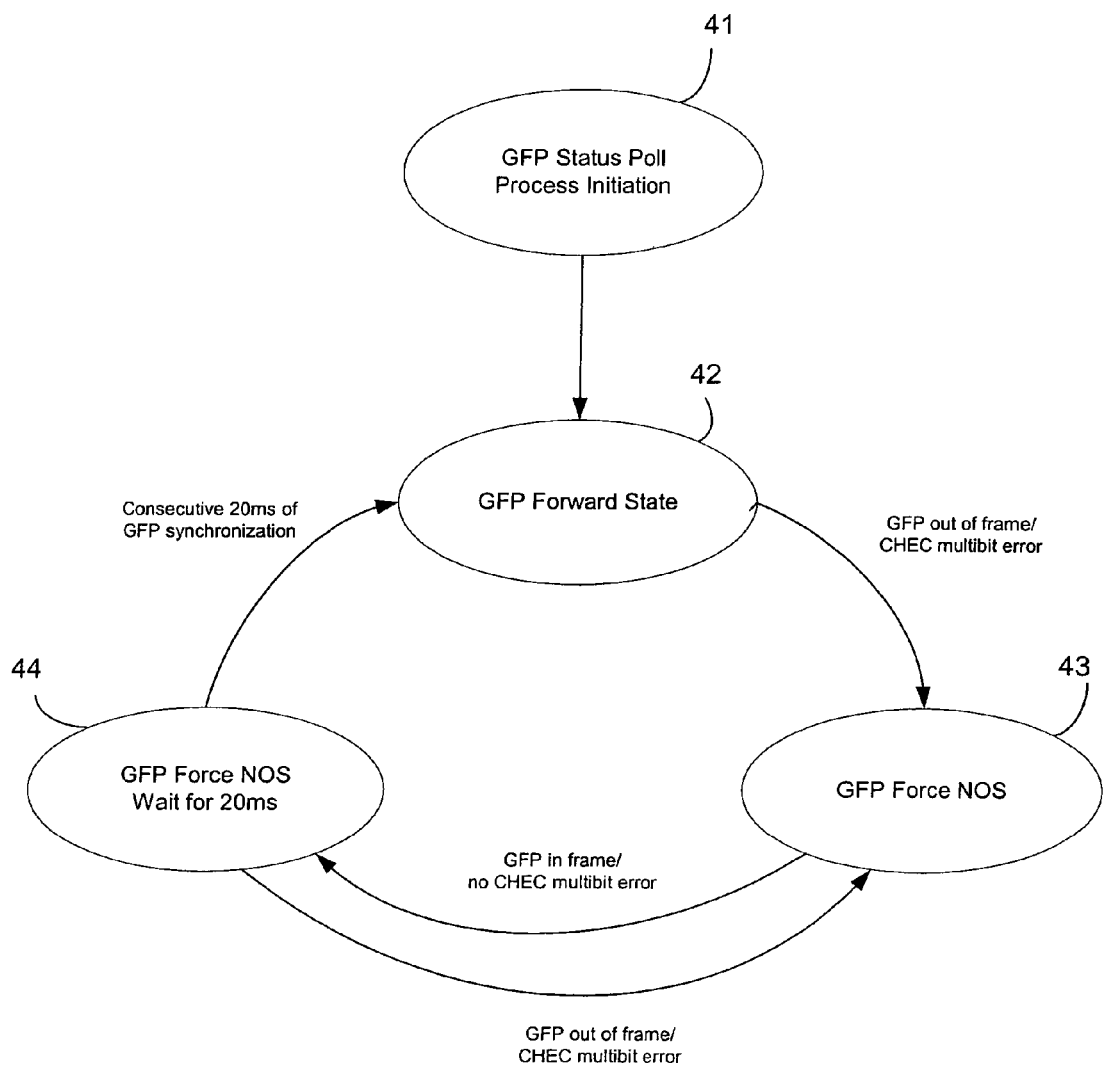
FIG. 2 is a state machine of operations of a transport interface, a port card, in the exemplary network of FIG. 1B, according to one embodiment of the present invention.

A state machine illustrated in FIG. 2 is implemented in software of the transport interface 29 and 39 which periodically polls the GFP synchronization status from hardware implementing the GFP engine. The process is started by initial state 41 and moves to a normal state 42 in which received GFP frames are forwarded by the transport interface 29 (39) to its corresponding Fibre Channel ports 26, 28 (36, 38). Upon detecting a GFP out-of-synchronization condition on the GFP-T path by CHEC multibit errors, the transport interface 29 (39) moves to state 43 and starts to transmit NOS to its corresponding Fibre Channel ports. When the SONET/SDH switch over is corrected or the error is corrected on the SONET/SDH transport path, the synchronization status is reset and the transport interface 29 (39) moves to state 44. The interface continues to transmit NOS for a period, 20 ms in the present embodiment, for debouncing and then stops the transmission of NOS to its corresponding Fibre Channel port. The transport interface returns to normal state 42. Once the NOS are turned off, the traffic returns between the Fibre Channel ports over the SONET/SDH transport path. On the other hand, if the out-of-synchronization status returns during the 20 ms waiting period, the transport interface returns to state 43 to await a resetting of the synchronization status.

The algorithm used in this invention works to the restart credit discovery process in the Fibre Channel ports, not just during SONET/SDH interruptions but also during cases of power-up of intermediate SONET nodes/card pulls and other traffic-affecting conditions.

The embodiment of the present invention described above is best implemented in the port cards 24 and 34 in the exemplary network of FIG. 1B. A hardware implementation in an ASIC (Application Specific Integrated Circuit) or an FPGA (Field Programmable Gate Array) is preferred for a high-speed implementation of the present invention for optimal response to failovers and errors in the transmission of the Fibre Channel frames across the SONET/SDH transport network 20.

Figure 3:
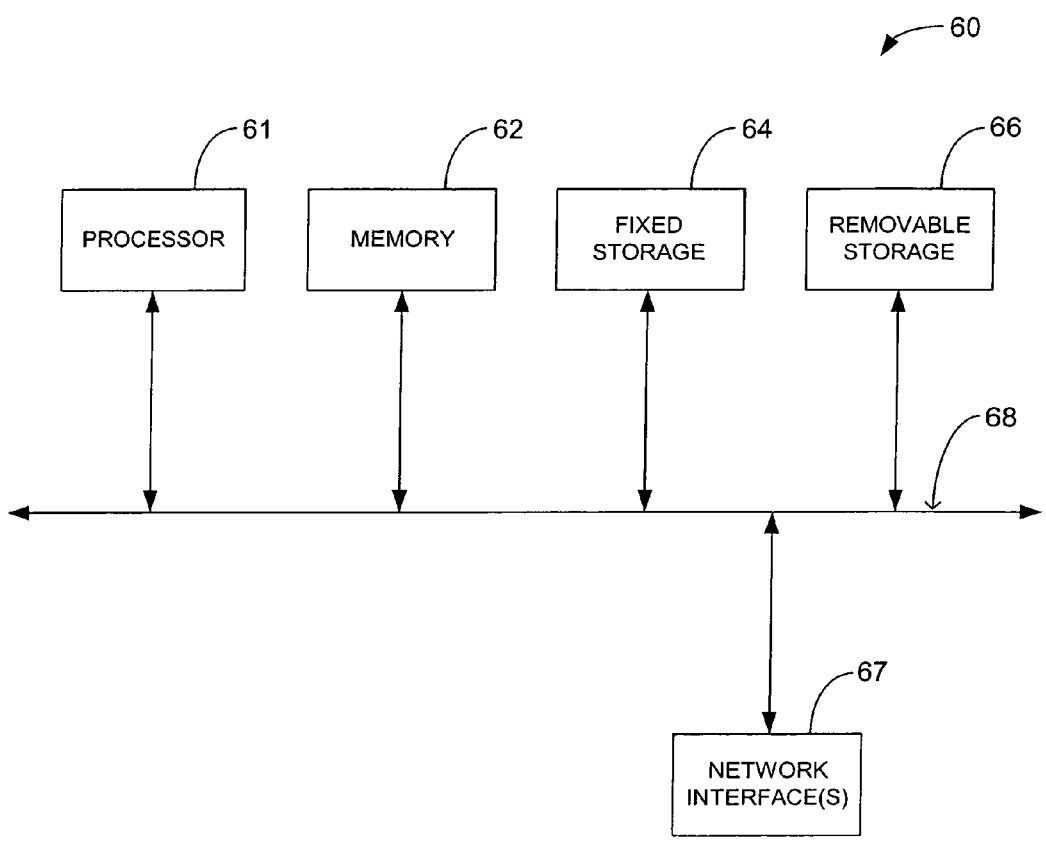
FIG. 3 is a block diagram of a portion of a port card of FIG. 1, according to one embodiment of the present invention.

The present invention might also be implemented in firmware, such as the ROM (Read-Only Memory) of a microcontroller in the port cards 24 and 34, or in software which offers certain advantages. For instance, a port card processor unit instructed by the software might perform operations described above, as well as other operations. Upgrades can be made easily in software. FIG. 3 shows a block diagram of a representative computer system 60 that may be used to execute the software of an embodiment of the invention. The computer system 60 includes memory 62 which can store and retrieve software programs incorporating computer code that implements aspects of the invention, data for use with the invention, and the like. Exemplary computer readable storage media include CD-ROM, floppy disk, tape, though for the Fibre Channel port cards 24 and 34 (and transport interfaces 29 and 39) flash memory, semiconductor system memory, and hard drive are more suitable at the present state of technology. The computer system 60 further includes subsystems, such as a central processor 61, fixed storage 64 (e.g., hard drive), and one or more network interfaces 67, all connected by a system bus 68. Other computer systems suitable for use with the invention may include additional or fewer subsystems. For example, computer system 60 may include more than one processor 61 (i.e., a multi-processor system) or a cache memory.

Testing results show the efficacy of the present invention. Without the link recovery mentioned above, any SONET/SDH failover, cross-connect switches, or UPSR (Unidirectional Path Switched Ring) switches can cause degraded performance or the total loss of credits between test equipment, such as a combination of Smartbits hardware and supporting software, and Fibre Channel switches. Smartbits is an industry standard for the analysis of various networks, including Fibre Channel. With the described link recovery mechanism in place, time for the traffic to resume at full line rate from the Smartbits test equipment is in the order of few milliseconds.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for efficient link recovery between first and second Fibre Channel ports communicating by the transport of GFP-encapsulated Fibre Channel client data frames across a SONET/SDH transport network, said first Fibre Channel port connected to said SONET/SDH transport network through a first transport interface and said second Fibre Channel port connected to said SONET/SDH transport network through a second transport interface, the method comprising:

polling a GFP synchronization status from said first transport interface to determine whether a GFP loss of synchronization has occurred at said first transport interface, wherein a GFP loss of synchronization signifies an interruption in said SONET/SDH transport network;

transmitting a stream of Ordered Sets from said first transport interface to said first Fibre Channel port in response to detecting a GFP loss of synchronization, the stream of Ordered Sets indicating to said first Fibre Channel port an interruption in said SONET/SDH transport network between said first and second transport interfaces; and performing link initialization and buffer credit recovery procedures in the first Fibre Channel port in response to receiving the stream of Ordered Sets from the first transport interface to recover the link with said second Fibre Channel port.

2. The method of claim 1 wherein a GFP loss of synchronization is determined to have occurred in response to the first transport interface receiving a multibit error indication in CHEC bits.

3. The method of claim 1 wherein said polling step is performed periodically.

4. The method of claim 1 wherein said stream of Ordered Sets comprises a stream of Fibre Channel Not Operational Ordered Sets.

5. The method of claim 1 further comprising: determining that said SONET/SDH transport network has regained synchronization; and subsequently terminating transmission of said stream of Ordered Set signals from the first transport interface to said first Fibre Channel port.

6. The method of claim 5 further comprising: waiting a predetermined amount of time before terminating transmission of said stream of Ordered Set signals.

7. The method of claim 6 wherein said predetermined amount of time comprises 20 milliseconds.

8. In a network system for transporting GFP-encapsulated Fibre Channel frames across a SONET/SDH transport network between first and second Fibre Channel ports, said first Fibre Channel port connected to said SONET/SDH transport network through a first transport interface and said second Fibre Channel port connected to said SONET/SDH transport network through a second transport interface, said first transport interface comprising:

at least one integrated circuit configured to poll a GFP synchronization status to determine whether a GFP loss of synchronization has occurred, wherein a GFP loss of synchronization signifies an interruption in said SONET/SDH transport network; and to transmit a stream of Ordered Sets to said first Fibre Channel port in response to detecting a GFP loss of synchronization, the stream of Ordered Sets indicating to said first Fibre Channel port an interruption in said SONET/SDH transport network between said first and second transport interfaces and causing said first Fibre Channel port to perform link initialization and buffer credit recovery procedures to recover the link with said second Fibre Channel port.

9. The first transport interface of claim 8 wherein said at least one integrated circuit is adapted to receive a multibit error indication in CHEC bits to detect said interruption in said SONET/SDH transport network.

10. The first transport interface of claim 8 wherein said at least one integrated circuit is adapted to poll periodically.

11. The first transport interface of claim 8 wherein said stream of Ordered Sets comprises a stream of Fibre Channel Not Operational Ordered Sets.

12. The first transport interface of claim 8 wherein said at least one integrated circuit is further adapted to determine that said SONET/SDH transport network has regained synchronization; and to subsequently terminate transmission of said stream of Ordered Sets to said first Fibre Channel port.

13. The first transport interface of claim 12 wherein said at least one integrated circuit is further adapted to wait a predetermined amount of time before terminating transmission of said stream of Ordered Sets to said first Fibre Channel port.

14. The first transport interface of claim 13 wherein said predetermined amount of time comprises 20 milliseconds.

15. In a network system for transporting GFP-encapsulated Fibre Channel frames across a SONET/SDH transport network between first and second Fibre Channel ports, said first Fibre Channel port connected to said SONET/SDH transport network through a first transport interface and said second Fibre Channel port connected to said SONET/SDH transport network through a second transport interface, said first transport interface comprising:

means for polling a GFP synchronization status to determine whether a GFP loss of synchronization has occurred, wherein a GFP loss of synchronization signifies an interruption in said SONET/SDH transport network; and means for transmitting a stream of Ordered Sets to said first Fibre Channel port in response to detecting a GFP loss of synchronization, the stream of Ordered Sets indicating to said first Fibre Channel port an interruption in said SONET/SDH transport network between said first and second transport interfaces and causing said first Fibre Channel port to perform link initialization and buffer credit recovery procedures to recover the link with said second Fibre Channel port.

16. The first transport interface of claim 15 wherein said means for polling includes means for receiving a multibit error indication in CHEC bits to detect said interruption in said SONET/SDH transport network.

17. The first transport interface of claim 15 wherein said means for polling operates periodically.

18. The first transport interface of claim 15 wherein said stream of Ordered Sets comprises a stream of Fibre Channel Not Operational Ordered Sets.

19. The first transport interface of claim 15 further comprising: means for determining that said SONET/SDH transport network has regained synchronization; and means for subsequently terminating transmission of said stream of Ordered Sets to said first Fibre Channel port.

20. The first transport interface of claim 19 wherein said subsequently terminating means waits a predetermined amount of time before terminating transmission of said stream of Ordered Sets to said first Fibre Channel port.

21. The first transport interface of claim 20 wherein said predetermined amount of time comprises 20 milliseconds.

* * * * *